(12) United States Patent
Trdinich et al.

(10) Patent No.: US 8,606,380 B2
(45) Date of Patent: *Dec. 10, 2013

(54) FANTASY SPORTS TRADE EVALUATOR SYSTEM AND METHOD

(75) Inventors: Joe Trdinich, San Jose, CA (US); Michael Graben, San Jose, CA (US); Ron Belmarch, Los Angeles, CA (US); Shane Kao, Santa Clara, CA (US); Joe Francis, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,960

(22) Filed: Sep. 14, 2012

(65) Prior Publication Data

US 2013/0017874 A1    Jan. 17, 2013

Related U.S. Application Data

(63) Continuation of application No. 13/180,664, filed on Jul. 12, 2011, now Pat. No. 8,340,794.

(51) Int. Cl.
*A63F 9/24*     (2006.01)
*A63F 13/00*    (2006.01)

(52) U.S. Cl.
USPC .................................. 700/92; 700/91; 463/9

(58) Field of Classification Search
USPC .......... 700/91–93; 463/1, 9, 16, 23, 29, 40–42
See application file for complete search history.

(56) References Cited

U.S. PATENT DOCUMENTS

| | | | | |
|---|---|---|---|---|
| 7,618,312 B1 * | 11/2009 | Kasten | ............................... | 463/7 |
| 8,099,182 B1 * | 1/2012 | Kasten | ............................ | 700/91 |
| 8,105,159 B2 * | 1/2012 | Wojewoda et al. | ............. | 463/31 |
| 8,340,794 B1 * | 12/2012 | Trdinich et al. | .................. | 700/91 |
| 2002/0107590 A1 * | 8/2002 | Liegey | ............................. | 700/91 |
| 2003/0054885 A1 * | 3/2003 | Pinto et al. | ....................... | 463/42 |
| 2004/0266535 A1 * | 12/2004 | Reeves | ............................. | 463/42 |
| 2006/0183548 A1 * | 8/2006 | Morris et al. | ................... | 463/42 |
| 2008/0026804 A1 * | 1/2008 | Baray et al. | ........................ | 463/9 |

(Continued)

OTHER PUBLICATIONS

McDonald, Tom. "Fantasy Football Trade Calculator". [dated Aug. 23, 2010], [online], [retrieved on Aug. 20, 2012]. <URL:http://web.archive.org/web/20100823101944/http://www.fantasyfootballdraft.com/fantasy_football_trade_calculator.asp>. 6 pages.*

(Continued)

*Primary Examiner* — Milap Shah
(74) *Attorney, Agent, or Firm* — James J. DeCarlo; Greenberg Traurig, LLP

(57) ABSTRACT

Disclosed is a trade evaluator for evaluating trades based on statistics of players to be traded, statistics of other players on each fantasy team, and settings of a fantasy league. A computer receives a request to analyze a trade of one or more players for one or more other players. The computer determines league settings and player statistics. For each player on the teams, the computer determines a position in a roster. The computer determines a highest value player for each position. If there is only one slot that can hold the highest ranked player still available to place, the computer fills the slot with that player. If there are multiple slots left, and each of those slots can also hold other player positions, the computer places the player in a slot with a lowest opportunity cost. The computer determines a point total for the teams with and without execution of the trade.

20 Claims, 7 Drawing Sheets

(56) References Cited

U.S. PATENT DOCUMENTS

| | | | |
|---|---|---|---|
| 2008/0125228 A1* | 5/2008 | Ware et al. | 463/42 |
| 2008/0281444 A1* | 11/2008 | Krieger et al. | 700/91 |
| 2010/0075729 A1* | 3/2010 | Allen et al. | 463/7 |
| 2010/0093415 A1* | 4/2010 | Kasten | 463/9 |
| 2011/0230243 A1* | 9/2011 | Hereford | 463/1 |
| 2011/0237317 A1* | 9/2011 | Noonan et al. | 463/2 |
| 2011/0319171 A1* | 12/2011 | Ngozika | 463/42 |
| 2012/0329541 A1* | 12/2012 | Allen et al. | 463/9 |
| 2013/0013092 A1* | 1/2013 | Lang et al. | 700/91 |

OTHER PUBLICATIONS

"The Dynasty Trade Analyzer—Instructions". DynastyGuys.com [dated Mar. 22, 2010], [online], [retrieved on Aug. 20, 2012]. <URL:http://web.archive.org/web/20100322210002/http://www.dynastyguys.com/page/the-dynasty-trade-analyzer>. 6 pages.*

Newman, Mark. "Front Office 2011 Makes Fantasy Easy". [dated Mar. 18, 2011], [online], [retrieved on Aug. 21, 2012], <URL:http://mlb.mlb.com/news/article.jsp?ymd=20110317&content_id=16995764&vkey=news_mlb&c_id=mlb>. 1 page.*

\* cited by examiner

FIG. 4

| FOOTBALL '10 | LEAGUE | MY TEAM | MATCHUP | PLAYERS | RESEARCH | DRAFT CENTRAL | COMMISH TOOLS | STATTRACKER |

Roster  My Watch List  Team Log  Edit Team Settings  Players:  Add  Drop  Trade  Notes Propose Trade                                                                    ← 400

| Stats | Game Day Decision | Projected Stats | Split Stats | Ranks | Opponents | Research |

Week 5 | Week 1-Week 5 | 2010-11 Season | 2009-10 | 2008-09 Fantasy Football Live

Players to Trade For

| Offense | Opp | Status | Rankings | | Trends | Passing | | | Rushing | | | Receiving | | | Ret | Misc | Fum | Fan Pts |
| | | | Projected | Actual | % Owned | Yds | TD | Int | Yds | TD | | Yds | TD | | TD | 2PT | Lost | |
| Rashard Mendenhall (Pit-RB) | Bye | | 2093 | 1837 | 99% | - | - | - | - | - | | - | - | | - | - | - | 0.00 |

Players to Trade Away

| Offense | Opp | Status | Rankings | | Trends | Passing | | | Rushing | | | Receiving | | | Ret | Misc | Fum | Fan Pts |
| | | | Projected | Actual | % Owned | Yds | TD | Int | Yds | TD | | Yds | TD | | TD | 2PT | Lost | |
| Greg Jennings (GB-WR)P | @Was | L, 15-13 | 25 | 2325 | 99% | 0 | 0 | 0 | 0 | 0 | | 22 | 0 | | 0 | 0 | 0 | 2.20 |

Add Note for Opposing Owner:

405

| Send Trade Proposal | Evaluate Trade | Cancel |

FIG. 5

Evaluate Trade
Compare projected optimal lineups for each remaining fantasy week to determine the fairness of proposed trade.

The BusDrivers | Mike G.
Greg Jennings p
85 | Wide Receiver
Green Bay Packers
O-Rank:24 | Bye Week:10
Proj. Pts Remaining 114.19
0.00

Cyclone Rangers | copymoose
Rashard Mendenhall
34 | Running Back
Pittsburgh Steelers
O-Rank:13 | Bye Week:5
Proj. Pts Remaining 145.36
0.00

Projected Optimal Lineups
The BusDrivers | Cyclone Rangers
Upcoming Weeks: 1|2|3|4|5|6|7|8|9|10|11|12|13|14|15|16

Current Lineup:

| | | Opp | Proj Pts |
|---|---|---|---|
| QB | Aaron Rodgers (GB-QB) | Mia | 18.47 |
| WR | Greg Jennings (GB-WR) | Mia | 10.86 |
| WR | Wes Walker (NE-WR) | Bal | 10.14 |
| WR | Austin Collie (Ind-WR) | @Was | 9.73 |
| RB | Arian Foster (Hou-RB) | KC | 17.94 |
| RB | Frank Gore (EF-RB) | Oak | 17.01 |
| TE | Antonio Gates (SD-TE) | @StL | 10.68 |
| K | Mason Crosby (GB-K) | Mia | 7.94 |
| DEF | New York (NYJ-DEF) | @Den | 9.35 |
| Bench | | | |
| BN | Jamaal Charles (KC-RB) | @Hou | 11.98 |
| BN | Ryan Torain (Was-RB) | Ind | 10.51 |

Week 6 Projected total (Current): 112.15

With Trade:

| | | Opp | Proj Pts |
|---|---|---|---|
| QB | Aaron Rodgers (GB-QB) | Mia | 18.47 |
| WR | Wes Walker (NE-WR) | Bal | 10.14 |
| WR | Austin Collie (Ind-WR) | @Was | 9.73 |
| WR | Mike Williams (TB-WR) | ND | 8.56 |
| RB | Arian Foster (Hou-RB) | KC | 17.94 |
| RB | Frank Gore (EF-RB) | Oak | 17.01 |
| TE | Antonio Gates (SD-TE) | @StL | 10.68 |
| K | Mason Crosby (GB-K) | Mia | 7.94 |
| DEF | New York (NYJ-DEF) | @Den | 9.35 |
| Bench | | | |
| BN | Rashard Mendenhall (Pit-RB) | Cle | 16.86 |
| BN | Jamaal Charles (KC-RB) | @Iou | 11.98 |

Week 6 Projected total (W/Trade): 109.85
Week 6 Point Differential: -2.30

Projected Fantasy Impact

| Teams | 1 | 2 | 3 | 4 | 5 | 6 | 7 | 8 | 9 | 10 | 11 | 12 | 13 | 14 | 15 | Playoffs | Seasonal Differential |
|---|---|---|---|---|---|---|---|---|---|---|---|---|---|---|---|---|---|
| The BusDrivers | - | - | - | - | even | -2.30 | -5.06 | -3.19 | -3.33 | even | -2.57 | -4.24 | -3.34 | -0.02 | 3.34 | 0.01 | -23.67 |
| Cyclone Rangers | - | - | - | - | even | -0.19 | 3.50 | -2.74 | -6.27 | -6.78 | 4.91 | 5.21 | 6.00 | -0.10 | -0.96 | - | +10.68 |

Add Notes for Opposing Owner: [ ]

[ Send Trade Proposal ] [ Compare Stats ] [ Cancel ]

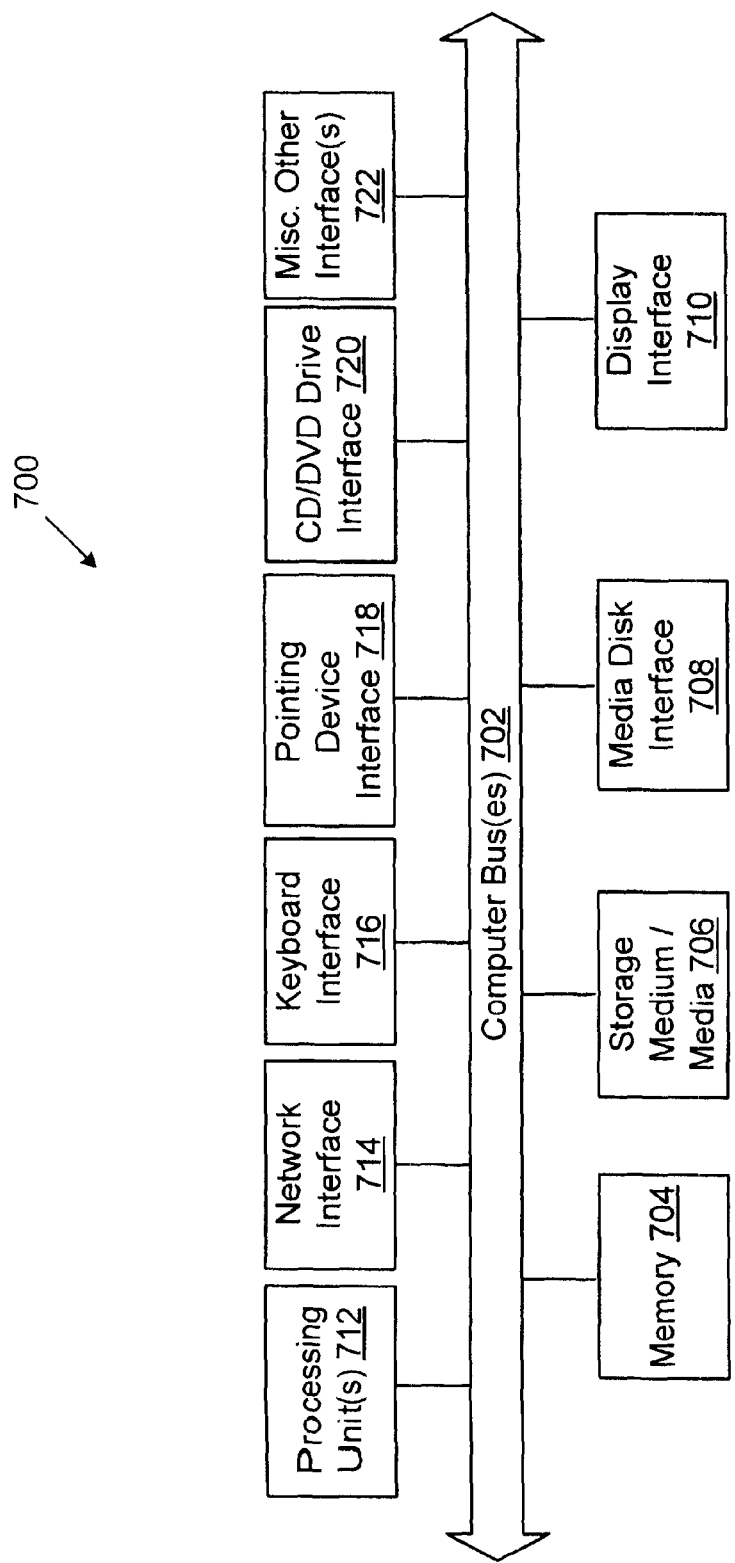

FANTASY SPORTS TRADE EVALUATOR SYSTEM AND METHOD

This application is a continuation of and claims the benefit of U.S. patent application Ser. No. 13/180,664, filed Jul. 12, 2011 now U.S. Pat. No. 8,340,794, which is hereby incorporated by reference in its entirety.

FIELD

The present disclosure relates to fantasy sports roster management, and more specifically to evaluating a trade between fantasy sports teams to determine which team(s) the trade benefits.

BACKGROUND

Fantasy sports leagues have become extremely popular. In a fantasy sport league, people (also referred to below as users or owners) draft real-life sports players for their fantasy teams. The drafted real-life sports players can be on the same real-life team or different real-life teams. The players then accrue points for the fantasy sports team depending on how the real-life sports player does in his or her sport in real life. For example, a person that is part of a football fantasy sports league may draft Tom Brady to play quarterback and Michael Turner to play running back on the person's fantasy sports team. When Tom Brady passes for 300 yards in a real-life football game, Tom Brady may earn 300 points (or some percentage of 300) for the person's fantasy sports team. Similarly, when Michael Turner rushes for 200 yards in a real-life football game, Michael Turner may accrue 200 points (or some percentage of 200) for the person's fantasy sports team. The fantasy sports league has several teams owned and managed by several people, and the winner of the fantasy league is the person (or people) whose team accrues the most points during the football season.

SUMMARY

Fantasy sports rosters include starter slots for players that will accumulate points for the fantasy sports team and bench slots for players on a fantasy sports team that will not be accumulating points for the fantasy sports team while on the bench. The owner can typically move players around in their roster (e.g., from a bench player to a starting player).

Determining whether to make a trade of one or more players for one or more other players on a different fantasy sports team can be difficult. Trade evaluators determine whether a trade benefits a fantasy sports team based on the projected points of each player in the trade. For example, if one fantasy sports team wants to trade Tom Brady for Peyton Manning, and Tom Brady is projected to pass for six more touchdowns during the regular football season, and Peyton Manning is projected to pass for five more touchdowns during the regular football season, trade evaluators would determine that trading Tom Brady for Peyton Manning is not beneficial to the fantasy sports team that currently has Tom Brady.

This disclosure relates to a trade evaluator that evaluates hypothetical trades based on projected statistics of the players to be traded, projected statistics of other players on each team, and league settings of a fantasy league. In one aspect, a computing device receives, for a first fantasy team in the fantasy league, a request to analyze a hypothetical trade of a first player from the first fantasy team for a second player of a second fantasy team of the fantasy league. The computing device determines statistics of players associated with each fantasy team. For each player on the fantasy teams, the computing device determines a particular position in a roster. The computing device then determines, based on the determined statistics associated with each player and settings associated with the fantasy league, a highest value player for each position in the roster. If there is only one roster slot that can hold the highest ranked player left to place, the computing device fills the roster slot with that player. If there are multiple roster slots left that can hold the player, and each of those roster slots can also hold other player positions, the computing device places the player in a roster slot with a lowest opportunity cost. The previous three steps are repeated for each player of the roster. The computing device then determines a projected point total for the fantasy teams with and without execution of the hypothetical trade of the first player for the second player. The computing device transmits the projected point totals for the fantasy teams to a user computer for display.

In one embodiment, the opportunity cost is a vector with dimension not greater than n−1, where n is the number of players on the first fantasy team. In one embodiment, the determining of the statistics of players associated with the first fantasy team further includes receiving projected points of the players. The determining of the highest value player for each position in the roster can include determining which players are to be placed in a bench slot in the roster.

In one embodiment, the computing device transmits the roster to the user computer for display with execution of the hypothetical trade and without execution of the hypothetical trade. Examples of the settings associated with the fantasy league include a number of each position used in the roster and a scoring system used in the fantasy league. In one embodiment, the players on the roster are sorted based on the projections of the players.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIGS. 4-6 are exemplary user interfaces displayed by the user computer of FIG. 1 and transmitted by the server computer of FIG. 1 in accordance with an embodiment of the present disclosure; and FIG. 7 is a block diagram illustrating an internal architecture of a computing device in accordance with an embodiment of the present disclosure.

DESCRIPTION OF EMBODIMENTS

Figure 1:
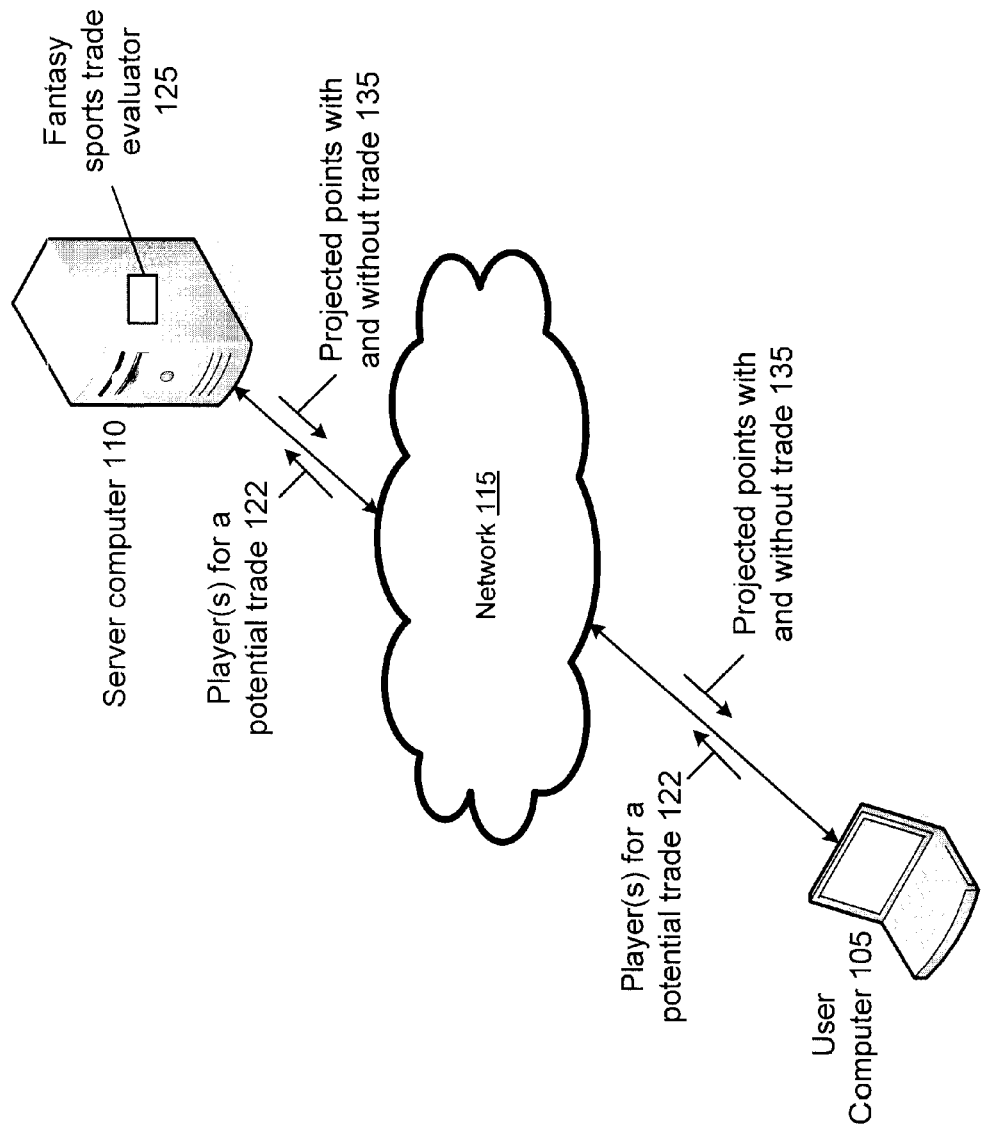
FIG. 1 is a block diagram of a user computer communicating with a server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Figure 2:
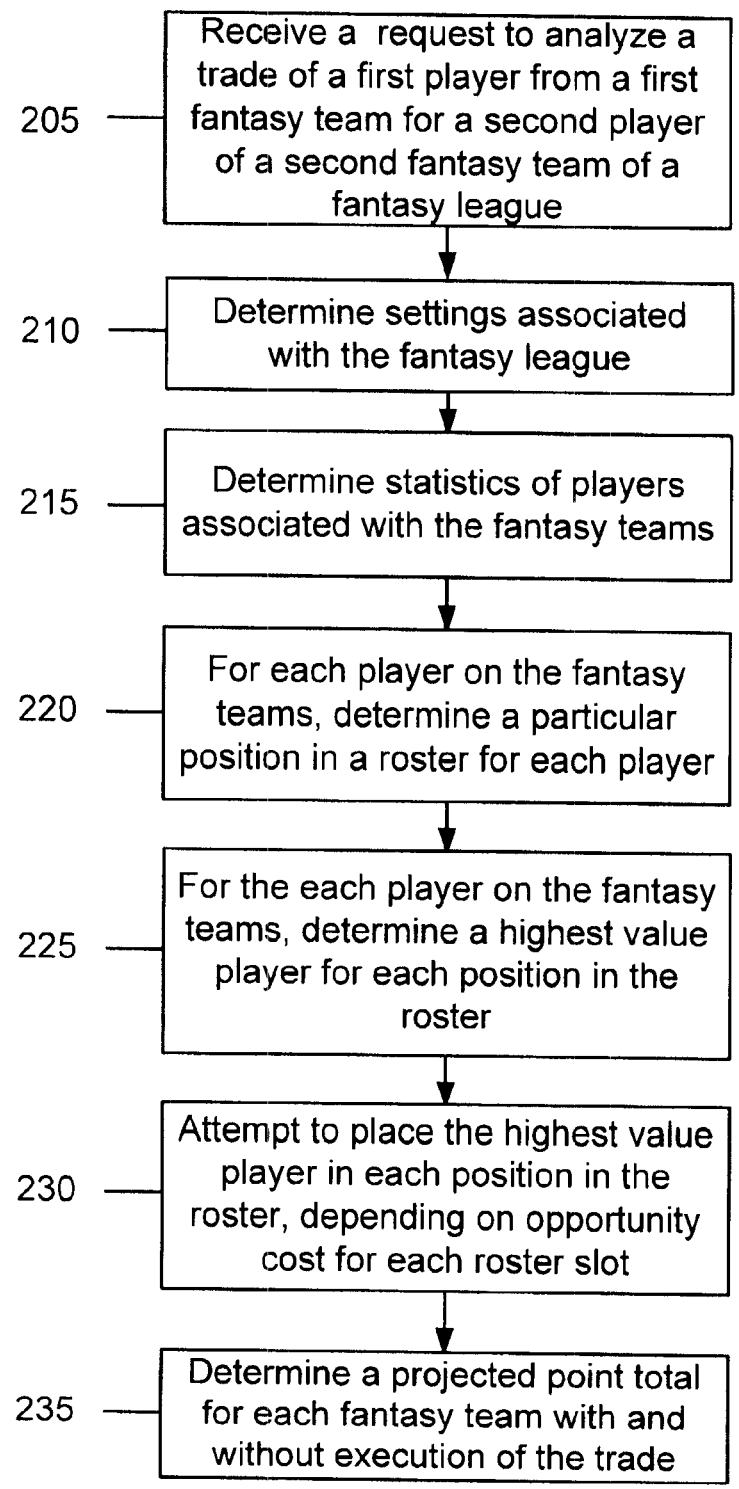
FIG. 2 is a flowchart illustrating steps performed by the server computer of FIG. 1 in accordance with an embodiment of the present disclosure.

FIG. 1 is a block diagram of an embodiment of a user computer 105 communicating with a server computer 110 that can be utilized to provide user access to one or more fantasy sports applications. Server 110 would generate and/or serve web pages, for example, to be displayed by a browser (not shown) of user computer 105 over a network 115 such as the Internet. In one embodiment, an owner of a fantasy sports team uses the user computer 105 to manage his or her fantasy sports team roster. FIG. 2 is a flowchart of an embodiment of the steps performed by a trade evaluator 125 of the server computer 110 to evaluate a hypothetical trade between two fantasy sports teams. Although described herein as a trade for two players between two fantasy sports teams, it should be noted that the trade evaluator described herein can be used to evaluate a trade for any number of players between any number of fantasy teams.

Although football is used as an example of a fantasy sport in which the trade evaluator 125 is used, the trade evaluator 125 can be used with any fantasy sport. Each fantasy league has settings for the set of roster positions each team must fill. In one embodiment, there is an approved set of players which is common across all fantasy football leagues, based on the players who play in the National Football League (NFL). Each one of those approved players can fill one or more roster positions. For example, a fantasy league may require a user to start a quarterback (QB), two running backs (RBs), three wide receivers (WRs), one tight-end (TE), one kicker (K), and one defensive end/safety (D/ST) each week. In one embodiment, these settings are customizable. In certain leagues, users fill their teams with 15 of the approved players, and they can draw from any of these 15 to fill all of the roster slots each week. Certain leagues have a scoring system which runs for 16 weeks, coinciding with weeks 1 through 16 in the NFL. The object of fantasy sports is to assemble a team that is optimized around a particular scoring system depending on the league a user participates in.

In one embodiment, the user of the user computer 105 logs into a web page provided by the server computer 110. The server computer 110 determines the user's players in the fantasy team roster and the fantasy league in which the user is participating. In one embodiment, the server computer 110 receives the user's players in the fantasy team roster from the user (e.g., the user uploads the rosters of the teams to the server computer 110 or uploads their own or a different set of projections to the trade evaluator 125). The user views his or her roster of players on the user computer 105. In one embodiment, the user transmits a request to the server computer 110 to analyze a trade of a first player 122 from the user's fantasy team for a second player of a second fantasy team in the fantasy league (step 205). In one embodiment, the trade evaluator 125 determines settings associated with the fantasy league (step 210). The settings associated with the fantasy league can include, for example, the number of each position used in a roster (e.g., this fantasy league requires two quarterbacks, two RBs, three WRs/RBs, etc. in their starting lineup) and/or the scoring system used in the fantasy league. The settings can be, for example, previously stored by the trade evaluator 125 or can be, for example, uploaded by the user.

In one embodiment, the trade evaluator 125 determines statistics of players associated with the two fantasy teams (step 215). In one embodiment, statistical projections are generated (e.g., by the server computer 110) or received from a third party (e.g., AccuScore™) In one embodiment, these projections are broken down in a by-week basis. One of the ways users decide how to fill their roster on any given week is to look at their available players and determine which combination of players will optimize their expected, or projected, points. Given these statistical projections, the fantasy league's scoring system, the league's configuration of roster positions, and the set of players from which to draw from, the trade evaluator 125 determines an optimal lineup (also referred to below as a roster).

In particular, in order to take a set of scoring projections for players, and use that to evaluate a trade between fantasy teams, the optimal lineup for the remaining weeks must be computed. The impact of the trade cannot be measured without determining whether/when the traded players will actually be used in an active roster spot (i.e., a starting roster slot) and thus contribute to the team's score. Thus, the trade evaluator 125 finds the lineup for the team that maximizes its expected score, by putting more valuable players in active slots and less valuable players on the bench.

To generate an optimal lineup, the trade evaluator 125 determines, for each player on the fantasy team, a particular position in the roster (step 220). This is trivial for players that only have one position. For players that are eligible for multiple positions, the trade evaluator 125 picks the position according to the scarcity of eligible roster spots for the different positions, and the number of players on the team that can fill those positions, in order to balance the demand for different roster spots on the team. For example, if a player was eligible for both RB and WR, and the team has two RB roster spots and 3 WR roster spots, and 4 (other) members of the team are eligible for WR and only one (other) member of the team is eligible for RB roster slots, the trade evaluator 125 would determine to treat this RB/WR eligible player as a RB. In another example, the RB/WR in question would be treated as a RB because there are not enough other RBs to fill up the spots. If, for example, there were two other RBs and four other WRs, this player could still be considered for a WR slot if they were projected for 100 points and all four WRs were projected for 50 points.

After completion of step 220, the trade evaluator 125 determines, for each player on the fantasy teams and based on the determined statistics associated with each player and the settings associated with the fantasy league, a highest value player for each position in the roster (step 225). In particular, the trade evaluator 125 has a set of roster spots which may take one or more positions, and a collection of players who are to be placed in exactly one position. The trade evaluator 125 then sorts the players on the team according to projected value, chooses the highest value player, and tries to place them in an available active roster spot (step 230). If multiple active roster spots are available for the player, the trade evaluator 125 executes the following algorithm.

Figure 3:
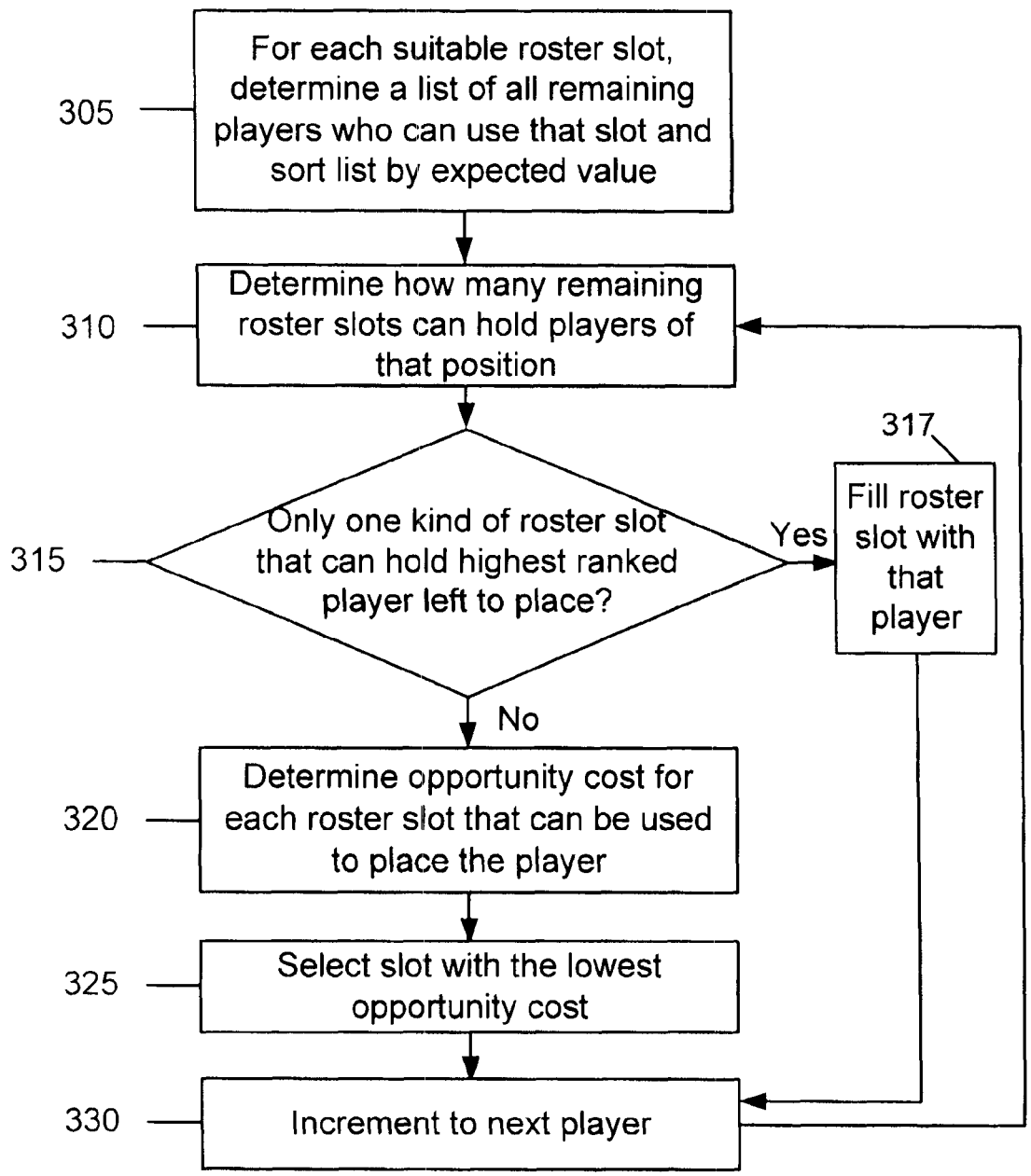
FIG. 3 is a flowchart illustrating additional steps performed by the server computer of FIG. 1 in accordance with an embodiment of the present disclosure.

Also referring to FIG. 3, the trade evaluator 125 determines, for each suitable roster slot, a list of all remaining players who can use that slot and sorts the list by expected value (step 305). The trade evaluator 125 then determines how many remaining roster slots can hold players of that position (step 310). If there is only one kind of roster slot that can hold the highest ranked player left to place (step 315), the trade evaluator 125 fills that roster slots with that player (step 317) and increment to the next player (step 330). For example, if a QB/RB slot is the last slot left that can hold a QB, and a QB is the highest rated player yet to be placed in the roster, then the trade evaluator 125 can safely fill that slot with the QB. The trade evaluator 125 has determined that any RB's being displaced have lower value than the QB because the players are being considered in rank order. Similarly, if there are multiple types of roster slots left that can hold the next player, but one of those slots can hold only that player position, the trade evaluator 125 can fill that slot with that player. For example, if a QB slot and a QB/RB slot are both left, and a QB is the highest ranked player left to place, the trade evaluator 125 can place him in the QB only slot.

If there are multiple roster slot types left that can hold the player and each of those types can also hold other player positions in step 315, the trade evaluator 125 determines an opportunity cost for each roster slot that can be used to place the player (step 320). For example, suppose the trade evaluator 125 is trying to place a QB, and available slots include QB/RB slot and a QB/WR slot. Depending on what other roster slots are empty, and what the positions are of remaining players on the team, a team may lose the opportunity to play a particular RB or WR depending on which slot is used for the QB. This choice can affect the projected scoring value of the lineup.

The trade evaluator 125 selects the slot with the lowest opportunity cost (step 325). In one embodiment, the opportunity cost is a vector, in one embodiment of dimension zero, and of dimension not greater than n−1, where n is the number of players on the team. The opportunity costs vector is, in one embodiment, defined as the values of the highest rated player at each eligible position for this slot who will be forced to the bench if this roster slot is consumed with the current player. In one embodiment, the position of the player currently being placed is excluded from consideration in this vector. For example, the trade evaluator 125 is currently placing a QB of value 20, and is considering a roster slot QB/RB/WR. The trade evaluator 125 examines what opportunity might be missed amongst RBs and WRs if this spot is consumed with the QB. Let's say, for example, there is 1 other RB slot left, 1 other WR slot left, and 3 RBs left to place, and 2 WRs left to place. If this spot is consumed with the QB, one more RB and one more WR can still be placed. It's the second best remaining RB and the second best remaining WR that will be forced to the bench (plus all the RBs and WRs worse than that). If the value of these players is: RB(17), RB (14), RB(12), WR(16), WR(16), then the opportunity cost vector is [17, 16]. In one embodiment, the dimensions of the opportunity cost are sorted by value, with highest value first. In one embodiment, the number of dimensions are the number of different player positions where players will be forced to the bench if the slot is consumed with the current player.

In one embodiment, this opportunity cost vector is calculated for each eligible roster slot type for the current player, and the slot with the lowest value is chosen. Opportunity cost vector A is less than vector B if A is less than B in dimension n without being greater than B in dimensions 1 ... (n−1). In other words, the trade evaluator 125 compares them along each dimension until the first dimension is found where one vector is less than the other. If one of the vectors does not even have that dimension, it is considered less. For example, vector [6, 4, 3] is less than vector [6, 5, 2] and vector [2] is less than vector [2, 1].

Once the trade evaluator 125 has placed the highest rated player in a roster slot, or alternatively placed him on the bench (if there were no eligible roster slots, for example), then the process is repeated for the next highest ranked player (step 330). This continues until all players have been placed, or all of the roster slots have been consumed. In one embodiment, any remaining players are placed on the bench. In one embodiment, the optimal lineup is computed for a given period of time, such as for the remaining weeks of an NFL season, to determine the impact of a trade. The impact of a trade can be determined by determining whether/when the traded players will actually be used in an active roster slot and thus contribute to the team score.

Referring again to FIGS. 1 and 2, the trade evaluator 125 then determines a projected point total for the fantasy teams with and without execution of the trade (step 235). The trade evaluator 125 transmits the projected point totals 135 for the fantasy teams to the user computer 105 for display.

Figure 6:
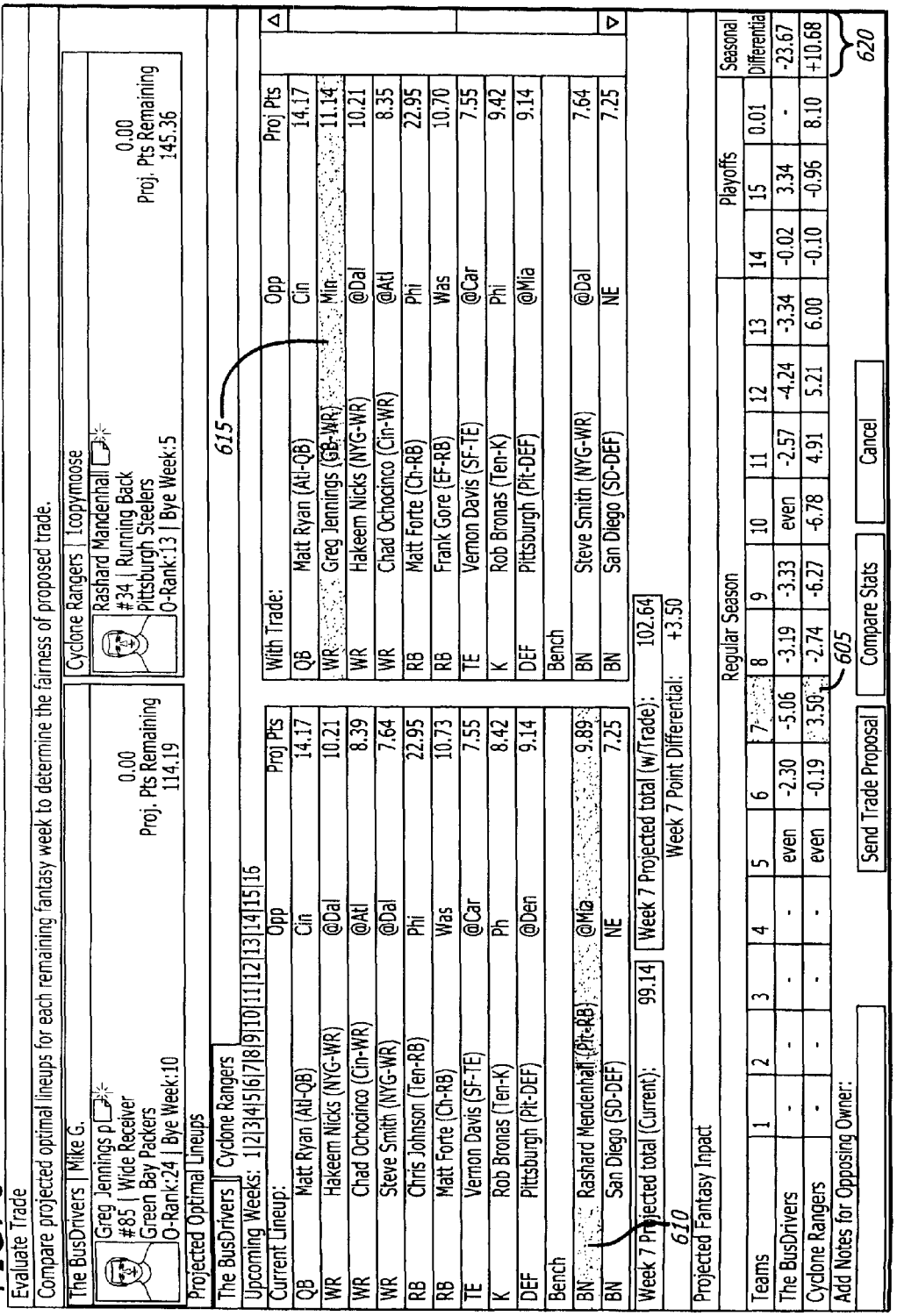

FIGS. 4-6 are examples of a user interface used with the trade evaluator 125. FIG. 4 shows an embodiment of a user interface 400 showing an "Evaluate Trade" button 405 that a user can select after a user has chosen the players to trade. In one embodiment, the user interface 400 summarizes the potential trade before the user transmits an offer to the other manager. In this embodiment, the user is offering Greg Jennings for Rashard Mendenhall. FIG. 5 shows an embodiment of a user interface 500 after the user selects the Evaluate Trade button 405 shown in FIG. 4. In one embodiment, a review 505, 507 of the players involved in the potential trade is shown. In this embodiment, the fantasy team BusDrivers owns Greg Jennings and the fantasy team Cyclone Rangers owns Rashard Mendenhall. The user computer 105 displays the total delta 510, 512 in points for each team if they were to make the trade. In this example, the BusDrivers would project to lose 23.67 points and the Cyclone Rangers would project to gain 10.68 points. Thus, according to the trade evaluator 125, this is a trade that would be beneficial to the Cyclone Rangers but not to the BusDrivers. In one embodiment, the trade evaluator 125 transmits for display the week point differentials, such as week 6 point differential 515 (i.e., the BusDrivers would lose 2.30 points in week 6 if they made this trade). In one embodiment, the computing device 105 also displays more details 520, 522 regarding the trade for the current week (in this example, week 6) for the BusDrivers. Thus, in this example, the BusDrivers can see exactly why they are projected to lose 2.30 points if they make this trade. The left column shows their team as it exists now, and the right column shows their team if they were to make the trade. This is where the optimal lineup algorithm comes into play. The top 9 players in this case would be the user's optimal lineup for that week, based on the projections. In this example, Greg Jennings is in the optimal lineup on the left. If the BusDrivers were to trade Jennings for Mendenhall, however, neither Jennings nor Mendenhall are, on the right, in the optimal lineup. Jennings is not there because he wouldn't be on the team anymore, and Mendenhall isn't there (he's on the Bench) because he doesn't project to score as many points as the other RBs on the BusDrivers for that week. When the totals for the projected lineups are added up, they currently project 112.15 and would project 109.85 if they were to make the trade, resulting in a loss of 2.30 points.

FIG. 6 is an embodiment of a user interface 600 showing the optimal lineups with and without the trade for the Cyclone Rangers for week 7. In one embodiment, the projected points 605 for week 7 can be selected and can result in the user viewing the optimal lineups for either the BusDrivers and/or the Cyclone Rangers.

The current lineup of the Cyclone Rangers includes Rashard Mendenhall as a bench player 610 on the left side of the user interface 600 and shows Greg Jennings as a starter 615 after occurrence of the trade on the right side of the user interface 600. This results in a week 7 projected total of 99.14 with the current lineup and a week 7 projected total of 102.64 with the trade. Thus, the projected points 605 for the BusDrivers is −5.06 with the trade and is +3.50 for the Cyclone Rangers with the trade. As a result, the trade benefits the Cyclone Rangers in week 7 and negatively impacts the BusDrivers in week 7. In one embodiment, the user interface 600 also includes the seasonal differential 620 of the trade for the two teams. In particular, the BusDrivers is negatively impacted by 23.67 points for the season with the execution of the trade and the Cyclone Rangers benefits positively by 10.68 points for the season with the execution of the trade.

In one embodiment, the trade evaluator 125 can be used to evaluate the obtaining of a free agent.

FIG. 7 is a block diagram illustrating an internal architecture of an example of a computing device, such as server computer 110 and/or user computer 105, in accordance with one or more embodiments of the present disclosure. A computer or computing device as referred to herein refers to any device with a processor capable of executing logic or coded instructions, and could be a server, personal computer, set top box, smart phone, pad computer or media device, to name a few such devices. As shown in the example of FIG. 7, internal architecture 700 includes one or more processing units (also referred to herein as CPUs) 712, which interface with at least one computer bus 702. Also interfacing with computer bus 702 are persistent storage medium/media 706, network interface 714, memory 704, e.g., random access memory (RAM), run-time transient memory, read only memory (ROM), etc., media disk drive interface 708 as an interface for a drive that can read and/or write to media including removable media such as floppy, CD-ROM, DVD, etc. media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces, a universal serial bus (USB) interface, and the like.

Memory 704 interfaces with computer bus 702 so as to provide information stored in memory 704 to CPU 712 during execution of software programs such as an operating system, application programs, device drivers, and software modules that comprise program code, and/or computer-executable process steps, incorporating functionality described herein, e.g., one or more of process flows described herein. CPU 712 first loads computer-executable process steps from storage, e.g., memory 704, storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage medium/media 706 is a computer readable storage medium(s) that can be used to store software and data, e.g., an operating system and one or more application programs. Persistent storage medium/media 706 can also be used to store device drivers, such as one or more of a digital camera driver, monitor driver, printer driver, scanner driver, or other device drivers, web pages, content files, playlists and other files. Persistent storage medium/media 706 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   (a) receiving, at a computing device, for a first fantasy team comprising a first set of players in a fantasy league, a request to analyze a hypothetical trade of one or more first players from the first fantasy team for one or more second players of a second fantasy team comprising a second set of players of the fantasy league, each of the fantasy teams having a roster including a plurality of different slots;
   (b) determining, by the computing device, statistics of all players associated with each of the fantasy teams;
   (c) for each player on each of the fantasy teams, determining, by the computing device, a particular slot in the roster without execution of the hypothetical trade, by:
      (i) determining, by the computing device and based on the determined statistics associated with each player and settings associated with the fantasy league, a highest value player for each slot in the roster for the first fantasy team based on the first set of players and for the second fantasy team based on the second set of players;
      (ii) if there is only one roster slot that can hold the highest ranked player still available to place, filling, by the computing device, the roster slot with that player;
      (iii) if there are multiple roster slots left that can hold the player, and each of those roster slots can also hold other players having different player positions, placing, by the computing device, the player with a lowest first opportunity cost in one of those roster slots;
      (iv) repeating steps (c)(i) - (c)(iii) until the roster is full;
   (d) determining, by the computing device, a projected point total for each of the fantasy teams without execution of the hypothetical trade of the one or more first players for the one or more second players, based on the rosters as determined by (c);
   (e) determining, by a computing device, a modified roster for each of the fantasy teams after execution of the hypothetical trade by:
      (i) determining, by the computing device and based on the determined statistics associated with each player and settings associated with the fantasy league, a highest value player for each slot in the modified roster for the first fantasy team based on each of the first set of players and the one or more second players, excluding the one or more first players, and for the second fantasy team based on each of the second set of players and the one or more first players, excluding the one or more second players;
      (ii) if there is only one modified roster slot that can hold the highest ranked player still available to place, filling, by the computing device, the roster slot with that player;
      (iii) if there are multiple modified roster slots left that can hold the player, and each of those roster slots can also hold other players having different player positions, placing, by the computing device, the player with a lowest second opportunity cost in one of the multiple modified roster slots;
      (iv) repeating (e)(i) - (e)(iii) until the modified roster is full;
   (f) determining, by the computing device, a projected point total for each of the fantasy teams with the execution of the hypothetical trade of the one or more first players for the one or more second players, based on the modified rosters as determined by (e); and
   (g) transmitting, by the computing device, each of the projected point totals with and without execution of the hypothetical trade for each of the fantasy teams to a user computer for display.

2. The method of claim 1, wherein the lowest first opportunity cost is a vector with dimension not greater than n−1, where n is a number of players in the first set of players.

3. The method of claim 1, wherein the determining of the statistics of the first set of players associated with the first fantasy team further comprises receiving projected points of the players.

4. The method of claim 1, wherein the determining of the highest value player for each slot in the roster further comprises determining which players are to be placed in a bench slot in the roster.

5. The method of claim 1, further comprising transmitting, by the computing device, the modified roster to the user computer for display with execution of the hypothetical trade and transmitting, by the computing device, the roster to the user computer for display without execution of the hypothetical trade.

6. The method of claim 1, further comprising repeating step (c)(iv) for a given period of time.

7. The method of claim 1, wherein the settings associated with the fantasy league comprise a number of each of the plurality of different slots used in the roster.

8. The method of claim 1, wherein the settings associated with the fantasy league comprise a scoring system used in the fantasy league.

9. The method of claim 1, further comprising sorting at least the first set of players based on the statistics of those players.

10. A non-transitory computer-readable storage medium tangibly storing thereon computer program instructions capable of being executed by a computer processor of a computing device, the computer program instructions defining the steps of:
   (a) receiving, at the computing device, for a first fantasy team comprising a first set of players in a fantasy league, a request to analyze a hypothetical trade of one or more first players from the first fantasy team for one or more second players of a second fantasy team comprising a second set of players of the fantasy league, each of the fantasy teams having a roster including a plurality of different slots;
(b) determining, by the computing device, statistics of all players associated with each of the fantasy teams;
(c) for each player on each of the fantasy teams, determining, by the computing device, a particular slot in the roster without execution of the hypothetical trade, by:
  (i) determining, by the computing device and based on the determined statistics associated with each player and settings associated with the fantasy league, a highest value player for each slot in the roster for the first fantasy team based on the first set of players and for the second fantasy team based on the second set of players;
  (ii) if there is only one roster slot that can hold the highest ranked player still available to place, filling, by the computing device, the roster slot with that player;
  (iii) if there are multiple roster slots left that can hold the player, and each of those roster slots can also hold other players having different player positions, placing, by the computing device, the player with a lowest first opportunity cost in one of those roster slots;
  (iv) repeating steps (c)(i) - (c)(iii) until the roster is full;
(d) determining, by the computing device, a projected point total for each of the fantasy teams without execution of the hypothetical trade of the one or more first players for the one or more second players, based on the rosters as determined by (c);
(e) determining, by a computing device, a modified roster for each of the fantasy teams after execution of the hypothetical trade by:
  (i) determining, by the computing device and based on the determined statistics associated with each player and settings associated with the fantasy league, a highest value player for each slot in the modified roster for the first fantasy team based on each of the first set of players and the one or more second players, excluding the one or more first players, and for the second fantasy team based on each of the second set of players and the one or more first players, excluding the one or more second players;
  (ii) if there is only one modified roster slot that can hold the highest ranked player still available to place, filling, by the computing device, the roster slot with that player;
  (iii) if there are multiple modified roster slots left that can hold the player, and each of those roster slots can also hold other players having different player positions, placing, by the computing device, the player with a lowest second opportunity cost in one of the multiple modified roster slots;
  (iv) repeating (e)(i) - (e)(iii) until the modified roster is full;
(f) determining, by the computing device, a projected point total for each of the fantasy teams with the execution of the hypothetical trade of the one or more first players for the one or more second players, based on the modified rosters as determined by (e); and
(g) transmitting, by the computing device, each of the projected point totals with and without execution of the hypothetical trade for each of the fantasy teams to a user computer for display.

11. The non-transitory computer-readable storage medium of claim 10, wherein the lowest first opportunity cost is a vector with dimension not greater than n−1, where n is a number of players in the first set of players.

12. The non-transitory computer-readable storage medium of claim 10, wherein the determining of the statistics of the first set of players associated with the first fantasy team further comprises receiving projected points of the players.

13. The non-transitory computer-readable storage medium of claim 10, wherein the determining of the highest value player for each position in the roster further comprises determining which players are to be placed in a bench slot in the roster.

14. The non-transitory computer-readable storage medium of claim 10, further comprising transmitting, by the computing device, the modified roster to the user computer for display with execution of the hypothetical trade and transmitting, by the computing device, the roster to the user computer for display without execution of the hypothetical trade.

15. The non-transitory computer-readable storage medium of claim 10, further comprising repeating step (c)(iv) for a given period of time.

16. The non-transitory computer-readable storage medium of claim 10, wherein the settings associated with the fantasy league comprise a number of each of the plurality of different slots used in the roster.

17. The non-transitory computer-readable storage medium of claim 10, wherein the settings associated with the fantasy league comprise a scoring system used in the fantasy league.

18. The non-transitory computer-readable storage medium of claim 10, further comprising sorting at least the first set of players based on the statistics of those players.

19. A computing device comprising:
  a processor;
  a non-transitory storage medium for tangibly storing thereon program logic for execution by the processor, the program logic comprising:
  (a) logic executed by the processor for receiving for a first fantasy team comprising a first set of players in a fantasy league, a request to analyze a hypothetical trade of one or more first players from the first fantasy team for one or more second players of a second fantasy team comprising a second set of players of the fantasy league, each of the fantasy teams having a roster including a plurality of different slots;
  (b) logic executed by the processor for determining statistics of all players associated with each of the fantasy teams;
  (c) for each player on each of the fantasy teams, logic executed by the processor for determining a particular slot in the roster without execution of the hypothetical trade, by:
    (i) logic executed by the processor for determining based on the determined statistics associated with each player and settings associated with the fantasy league, a highest value player for each slot in the roster for the first fantasy team based on the first set of players and for the second fantasy team based on the second set of players;
    (ii) if there is only one roster slot that can hold the highest ranked player still available to place, logic executed by the processor for filling the roster slot with that player;
    (iii) if there are multiple roster slots left that can hold the player, and each of those roster slots can also hold other players having different player positions, logic executed by the processor for placing the player with a lowest first opportunity cost in one of those roster slots;

(iv) repeating steps (c)(i) - (c)(iii) until the roster is full;
(d) logic executed by the processor for determining a projected point total for each of the fantasy teams without execution of the hypothetical trade of the one or more first players for the one or more second players, based on the rosters as determined by (c);
(e) logic executed by the processor for determining a modified roster for each of the fantasy teams after execution of the hypothetical trade by:
  (i) logic executed by the processor for determining based on the determined statistics associated with each player and settings associated with the fantasy league, a highest value player for each slot in the modified roster for the first fantasy team based on each of the first set of players and the one or more second players, excluding the one or more first players, and for the second fantasy team based on each of the second set of players and the one or more first players, excluding the one or more second players;
  (ii) if there is only one modified roster slot that can hold the highest ranked player still available to place, logic executed by the processor for filling the roster slot with that player;
  (iii) if there are multiple modified roster slots left that can hold the player, and each of those roster slots can also hold other players having different player positions, logic executed by the processor for placing the player with a lowest second opportunity cost in one of the multiple modified roster slots;
  (iv) repeating (e)(i) - (e)(iii) until the modified roster is full;
(f) logic executed by the processor for determining a projected point total for each of the fantasy teams with the execution of the hypothetical trade of the one or more first players for the one or more second players, based on the modified rosters as determined by (e); and
(g) logic executed by the processor for transmitting each of the projected point totals with and without execution of the hypothetical trade for each of the fantasy teams to a user computer for display.

20. The computing device of claim 19, wherein the lowest first opportunity cost is a vector with dimension not greater than n−1, where n is a number of players in the first set of players.

* * * * *